UNITED STATES PATENT OFFICE.

JAMES E. SUMMERS, OF CLIFTON FORGE, VIRGINIA.

COMPOSITION OF MATTER.

SPECIFICATION forming part of Letters Patent No. 525,926, dated September 11, 1894.

Application filed March 30, 1894. Serial No. 505,678. (No specimens.)

*To all whom it may concern:*

Be it known that I, JAMES E. SUMMERS, a citizen of the United States, residing at Clifton Forge, in the county of Alleghany and State of Virginia, have invented a new and useful Composition of Matter to be Used as a Wall-Plaster, of which the following is a specification.

My composition consists of the following ingredients combined in or about the proportions stated, viz: pulverized slaked lime, twenty-two parts; cement, eight parts; plaster of paris, eighteen parts; pulverized iron furnace slag, thirty-five parts; pulverized limestone, ten parts; pulverized oyster shells, seven parts. These ingredients I mix together dry and, when using the composition as a wall-plaster, mix the whole with such an amount of water as will reduce the mass to the desired consistency, and in this condition immediately apply it to the wall or walls to be plastered, "rod" or "darby" it and then "trowel it down" the same as regular "hard finish" is troweled, thereby finishing the plastering with one coat of mortar which may be done from one and the same scaffolding. The wall-plaster thus made is found of great value, as it is almost entirely fire and water proof; and after being applied to the wall, becomes hard in from one to two hours or thereabout, and dries in about from one to two days. Freezing does not injure it and moisture does not penetrate it. As a mortar for plastering, it can be easily finished with one coat and as hereinbefore observed, from one scaffolding, as the furnace slag prevents bad and sappy laths from staining through it. It becomes as hard as stone, and as before observed, is almost fire and water proof, deadens sound, and altogether constitutes a perfect wall-plaster.

What I claim, and desire to secure by Letters Patent of the United States, is—

The herein-described composition of matter to be used as a wall plaster, consisting of pulverized lime, cement, plaster of paris, pulverized furnace slag, pulverized limestone and pulverized oyster shells, in or about the proportions specified.

JAMES E. SUMMERS.

Witnesses:
JOHN E. DAVIS,
PHILIP LINDENBERGER.